C. N. TARTANIAN 3,538,335

LIGHT INTENSITY CONTROLLER FOR PHOTOSENSITIVE PICKUP TUBES

Filed Nov. 27, 1968 2 Sheets-Sheet 1

INVENTOR:
CHARLES N. TARTANIAN
BY Irving M. Freedman
ATTORNEY

Nov. 3, 1970 C. N. TARTANIAN 3,538,335

LIGHT INTENSITY CONTROLLER FOR PHOTOSENSITIVE PICKUP TUBES

Filed Nov. 27. 1968 2 Sheets-Sheet 2

INVENTOR:
CHARLES N. TARTANIAN

BY

Irving M. Freedman

ATTORNEY

United States Patent Office 3,538,335
Patented Nov. 3, 1970

3,538,335

LIGHT INTENSITY CONTROLLER FOR PHOTOSENSITIVE PICKUP TUBES

Charles N. Tartanian, New Hartford, N.Y., assignor to General Electric Company, a corporation of New York Filed Nov. 27, 1968, Ser. No. 779,355
Int. Cl. G01j *1/40;* G03b *7/08*
U.S. Cl. 250—201 6 Claims

ABSTRACT OF THE DISCLOSURE

An automatic light control system is operable in a NORMAL mode to provide constant image sensor photosurface illumination when scene brightness is below a predetermined level and operable in an OVEREXPOSURE mode to protect the image sensor from possible damage when scene brightness is above a predetermined level. Two illumination control means are disposed in cascade before an image sensor. One means is a continuously variable light compensating device driven by a DC servomotor. The second means is an optical shutter driven by a shutter actuator. Error sensing circuits provide drive signals for the motor and actuator. In the NORMAL mode, an error sensing circuit compares a single-valued analog control signal related to intensity of image sensor photosurface illumination with a first reference DC signal related to desired photosurface illumination level. In the OVEREXPOSURE mode, an error sensing circuit compares a DC analog control signal proportional to servomotor displacement with a second reference signal related to near-zero photosurface illumination. A bistable logic switching circuit responsive to a predetermined level of scene brightness selectively connects the appropriate control and reference signals to the error sensing circuit. The predetermined level may, for example, be that of direct sunlight or reflected sunlight from a white surface.

BACKGROUND OF THE INVENTION

This invention relates to systems for controlling the transmission of light. More specifically, it relates to systems for controlling intensity of light admitted to the surface of a photosensitive element.

Television image devices such as image orthicon and vidicon tubes operate optimally for small variations of photosurface illumination. For this reason, light compensating arrangements have been provided to maintain illumination on the photosurface of television pickup tubes substantially constant. One manner of light compensation has been achieved by placing a variable neutral density filter in front of an image sensor. A variable neutral density filter is an optical filter which provides uniform optical transmission with respect to usable image sensor spectral response and is variable in optical density with respect to filter displacement so that its opacity may be changed in order to produce variable light attenuation. A variable neutral density filter used in connection with an image sensor may, for example, comprise first and second discs which are coaxially mounted. The density of these discs would typically vary from substantially clear to substantially opaque with angular displacement from a reference point on each disc. When viewed axially one disc's opacity would increase in a clockwise manner while the second disc's opacity would increase in a counterclockwise manner. The discs are rotated in opposite directions to provide light attenuation when viewed from a sector disposed in front of the image sensor photosurface. If desired, only a portion of the second disc need be provided. This portion would be fixed in position and cover the required sector. Alternatively, the neutral density filter may comprise a neutral density film tape loop. This form of neutral density filter can be obtained by either using a photographic-type emulsion which has been exposed and processed to achieve a uniform density versus linear displacement characteristic or by the use of a stable substrate upon which a suitable spectroscopic deposition has been placed to achieve the desired optical characteristic. Two such identical tapes are spliced together to form a loop such that they vary in neutral density in opposition to each other. Either form of variable neutral density filter may be driven by a motor to position the filter, thus varying filter opacity and the intensity of light admitted to the photosurface of the image sensor. In both cases the total optical density is the sum of the individual adjacent densities of each filter. One arrangement for maintaining constant photosurface illumination comprises connecting the output of the image sensor to suitable video processing circuits and motor control circuit logic which drives the motor to properly vary the density of the filter. Such a system embodies only one mode of operation. The filter is positioned in a linear manner to regulate the intensity of light admitted to the photosurface. This arrangement is generally satisfactory in applications in which scene brightness varies continuously over a limited range. However, in certain other applications this mode of operation is insufficient.

An example of such an application is that of automatic low light level image orthicon television camera system operating aboard an earth-orbiting satellite and trained on the earth's surface. The range of scene brightness to which the image sensor may be exposed would typically lie between $1\times10^{-8}$ to $1\times10^{4}$ foot-lamberts. The lowest levels would most likely occur during overcast moonless evenings in low contrast scenes while the highest light levels would occur during the day when direct sunlight would either come directly within the field of view of the system or fall on very large and bright surfaces such as beach areas, snowy landscapes, or white clouds. In such systems a suitable image sensor would be one capable of optimum operation at $1\times10^{-3}$ foot-lamberts scene brightness. Thus when the scene brightness is at a level of $1\times10^{-3}$ foot-lamberts or below, the image sensor may be trained directly on the scene with the clear portion of a variable neutral density filter disposed before it. However, when scene brightness increases above $1\times10^{-3}$ foot-lamberts, optical density of the filter is increased to maintain constant illumination on the image sensor photosurface.

Other applications in which a light compensating system to maintain constant photo surface illumination on the face of an image sensor include television studio use or applications in which a television camera might be placed outdoors at nighttime. In any application, the scene brightness may go from its lowest level to its highest level substantially instantaneously. In such a situation, the counter-rotating discs or opposing areas of a tape loop which comprise a neutral density filter must travel the maximum distance to provide the desired light compensation. This operation requires the longest possible time period for this system to compensate for scene brightness. Since an image sensor having an optimal operating level as low as $1\times10^{-3}$ foot-lamberts is extremely sensitive, it is exposed to the possibility of permanent damage when exposed to scenes having a high level of brightness. It would be desirable to provide a system having a mode of operation in which maximum protection for the image sensor is provided in response to large increase in scene brightness or photosurface illumination.

It is therefore an object of the present invention to provide an automatic light control system capable of controlling the light admitted to the photosurface of an image sensor which system provides rapid response over a large range of scene brightness and operates to protect the image sensor from damage due to intense photosurface illumination.

It is a more specific object of the present invention to provide an automatic light control system operable in a first linear light-compensating mode when photosurface illumination is below a desired level and operable in a second mode in response to undesirably high levels of photosurface illumination to provide maximum protection for the image sensor.

It is a further object of the present invention to provide a system of the type described including means automatically responsive to scene brightness above a predetermined level to initiate operation in the mode in which the image sensor is protected.

BRIEF SUMMARY OF THE INVENTION

Briefly, stated, in accordance with the present invention there is provided an automatic light control system operable in a NORMAL mode to provide light compensation for an image sensor when photosurface illumination is below a desired level and operable in an OVEREXPOSURE mode to protect the image sensor when photosurface illumination exceeds the desired level. The system comprises light compensating means disposed before an image sensor and driven by a servomotor connected to an error sensing circuit. In the NORMAL mode, the error sensing circuit compares a signal proportional to the intensity of light admitted to the photosurface of the image sensor to a first reference signal to provide linear light compensation. In the OVEREXPOSURE mode, the error sensing circuit operates the light compensating means with maximum speed to provide protection for the image sensor. In addition, means responsive to scene brightness are provided to automatically switch the system from NORMAL mode to OVEREXPOSURE mode operation when scene brightness exceeds a predetermined level, for example, that of direct sunlight.

BRIEF DESCRIPTION OF THE DRAWINGS

The foregoing objects and features of novelty which characterize the present invention are pointed out with particularity in the appended claims. For a better understanding of the present invention, together with further specific objects and advantages attained with its use, reference should be had to the following drawings taken in connection with the following description.

Of the drawings.

DESCRIPTION OF THE PREFERRED EMBODIMENT

Figure 1:
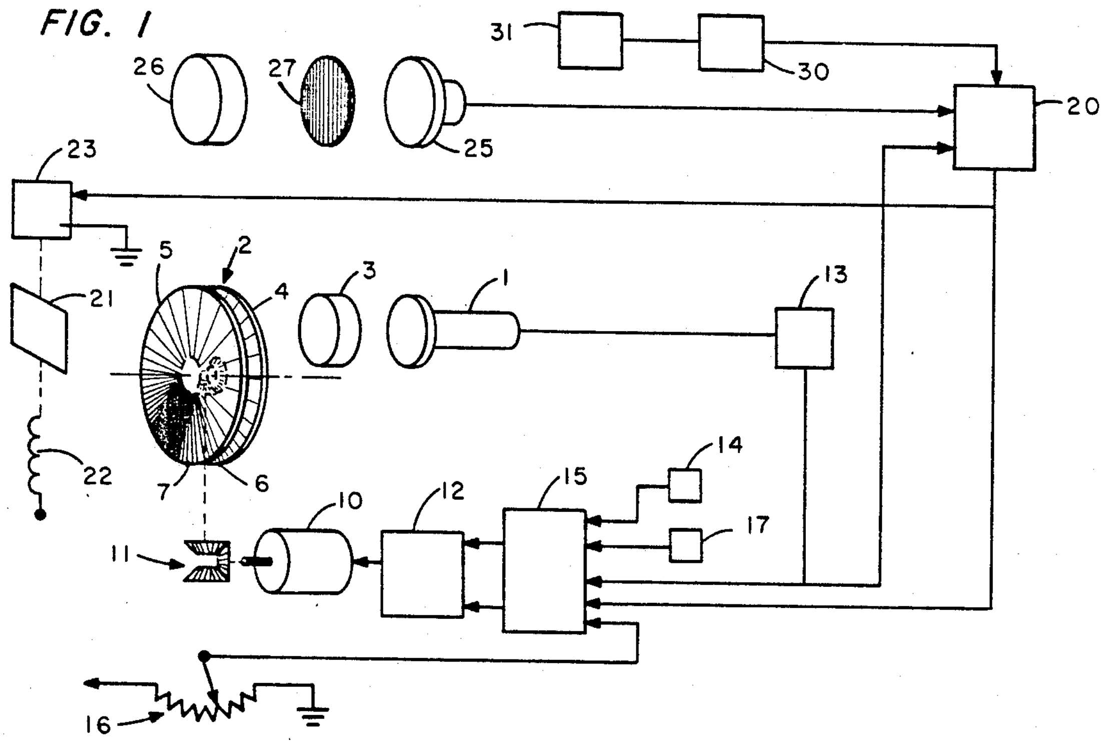
FIG. 1 is a diagrammatic representation of one embodiment of the present invention.

FIG. 1 illustates an automatic light control system constructed in accordance with the present invention. This system could, for example, be placed in a satellite orbiting the earth, and the image sensor 1 could be trained on the earth's surface. The levels of scene brightness encountered may range from $1\times10^{-8}$ foot-lamberts to $1\times10^{4}$ foot-lamberts. A sensitive image sensor 1 may be provided so that it operates optimally at scene brightness levels of $1\times10^{-3}$ foot-lamberts. At this light level, or at lower light levels, no light compensation is required. As scene brightness increases toward $1\times10^{4}$ foot-lamberts, light compensation is provided to maintain constant illumination on the image sensor photosurface.

Desired operation is achieved by providing two modes of operation. The system is operated in a NORMAL mode in order to maintain constant illumination on the photosurface of the image sensor 1, thus providing for optimal image sensor operation. If photosurface illumination reaches an undesirably high level before adequate light compensation is provided in the NORMAL mode, the system operates in an OVEREXPOSURE mode to provide maximum protection for the image sensor 1.

Light compensating means are provided in the form of a variable neutral density filter 2 which is placed in front of the image sensor 1. An optical lens 3 transmits light from the scene to the photosurface of the image sensor 1. The neutral density filter 2 transmits equally all frequencies of usable image sensor spectral response of the image sensor 1. In addition, the filter 2 is variable in optical density so that it may be driven to regulate the intensity of light on the photosurface. The filter 2 may, for example, comprise identical first and second coaxially mounted discs 4 and 5 which are positioned so that a sector of each disc 4 and 5 is disposed in front of the photosurface of the image sensor 1. The discs 4 and 5 vary linearly in optical density with the angular displacement in opposite directions from points 6 and 7 on the discs 4 and 5 respectively. The density of the filter 2 is equal to the sum of the densities of the portions of the discs 4 and 5 disposed in front of the image sensor 1. When the position of the filter is changed, i.e., when the discs are counter-rotated, the opacity of the filter 2 varies. The discs 4 and 5 are driven by a servomotor 10. A mechanical coupling arrangement 11 is coupled between the motor 10 and discs 4 and 5, and suitable gearing is provided so that the discs 4 and 5 are counter-rotated when the motor 10 is energized. The position of the discs 4 and 5, which may be referred to as the position of the filter 2, and hence the optical density of the filter 2 is determined by the displacement of the servomotor 10.

It sould be noted that any gearing ratio may be provided between the servomotor 10 and the discs 4 and 5, and that it may require a number of revolutions of the shaft of the servomotor 10 to rotate the discs 360°. Therefore, the term displacement is here used to denote the displacement of the servomotor 10 during a particular revolution. Therefore, displacement may, for example, mean displacement between 0° to 1,080°, which would correspond to a 3 to 1 gear ratio between the discs and the motor, or 0° to the displacement corresponding to any desired gear ratio. The displacement of the servomotor 10 is responsive to the output of an error sensing circuit 12. It should be noted that, if desired, rather than providing two neutral density discs, a single neutral density wedge which is fixed in position and varying in neutral density and a single rotating disc could also be disposed in front of the image sensor 1.

The output of the image sensor 1 is coupled to an amplifier 13 which produces a DC output signal representative of the photosurface illumination. This output signal is the NORMAL mode control signal and it is compared to a normal mode reference potential supplied by a DC source 14. A bilevel logic switching circuit 15 connects the NORMAL control signal and NORMAL reference potential to the inputs of the error sensing circuit 12. The level of the NORMAL reference potential is set so that the error between these inputs to the error sensing circuit 12 is nulled when photosurface illumination is at the optimal level for operation of the image sensor 1. Except in cases where the difference between the NORMAL control signal and NORMAL reference potential is relatively great, the error sensing circuit 12 operates linearly to produce an output proportional to the error. The displacement of the motor 10 varies with the output of the error circuit 12. The position of the filter 2 is varied until the necessary light compensation is provided and the output of the error circuit 12 is nulled. Thus the system operates substantially linearly to maintain constant photosurface illumination for the image sensor 1.

An analog circuit 16 is mechanically coupled to the mechanical coupling arrangement 11 to produce a single-valued, DC analog OVEREXPOSURE mode control signal which varies directly with the position of the discs 4 and 5 within the filter 2. During OVEREXPOSURE mode operation, the bilevel logic switching circuit 15 connects the OVEREXPOSURE control signal to be compared by the error sensing circuit 12 with an OVEREXPOSURE reference potential supplied by a DC source 17. The OVEREXPOSURE reference potential may be set so that the error between it and the OVEREXPOSURE control signal is nulled when the filter 2 is in its most dense position. In the OVEREXPOSURE mode, the error circuit 12 produces an output to change displacement of the motor 10 to increase the density of the filter 2 whenever the discs 4 and 5 present less than maximum optical density in front of the image sensor 1. In this mode, the system always operates to move the filter 2 to its most dense position as quickly as possible rather than to linearly compensate for changes in scene brightness.

The system is switched into either the NORMAL or OVEREXPOSURE mode of operation by a control unit 20. The control unit 20 produces a bilevel command signal in response to scene brightness and photosurface illumination. The command signal is coupled to the bilevel logic switching circuit 15. When scene brightness is below a predetermined level and when photosurface illumination is not undesirably high, the command signal is of a first level to operate the system in the NORMAL mode. The control unit 20 produces a command signal having a second level in response to scene brightness over the predetermined level or undesirably high photosurface illumination to initiate OVEREXPOSURE mode operation. The predetermined level of scene brightness could be that of direct sunlight. If the image sensor operates optimally for a level of photosurface illumination of $1\times10^{-3}$ foot-lamberts, an undesirably high level could be $2\times10^{-3}$ foot-lamberts. Any level of photosurface illumination of at least $2\times10^{-3}$ foot-lamberts may be referred to as the override level.

In addition, in order to provide for additional protection of the image sensor 1 during OVEREXPOSURE mode operation, the control unit 20 operates a shutter 21. The shutter 21 is biased toward a closed position, i.e., in front of the image sensor 1, by a spring 22, and is mechanically coupled to a shutter actuator 23. The shutter actuator 23, which may conveniently comprise a solenoid, is connected to the control unit 20 and operated in response to the command signal. When the command signal is at its first level, the shutter 23 is actuated and opens the shutter 21, i.e., removes it from in front of the image sensor 1. The second level of the command signal deenergizes the shutter actuator 23, and the shutter closes. Since the spring 22 biases the shutter 21 closed when the system is not energized, protection for the image sensor 1 is provided when the control system is placed in storage.

The control unit 20 is made responsive to photosurface illumination during NORMAL mode operation by connecting the NORMAL mode control signal to it.

If the scene brightness suddenly increases so that photosurface illumination reaches the override level before the filter 2 can compensate sufficiently, the NORMAL mode control signal becomes sufficiently great to operate the control unit 20 to produce a command signal of the second level. OVEREXPOSURE mode operation is initiated, and the discs 4 and 5 start to rotate toward their most dense position. At the same time, the shuter 21 is closed. Consequenly, the NORMAL mode control signal goes to its lowest level and the input to the control unit 20 is such that NORMAL mode operation is resumed. If the photosurface illumination is still undesirably high when the shutter 21 is reopened, OVEREXPOSURE mode initiation is resumed. The system cycles from NORMAL to OVEREXPOSURE mode operation until adequate light compensation is provided. By providing appropriate circuitry to provide for a minimum duration of OVEREXPOSURE mode operation, a small number of cycles might be required to rotate the filter 2 to a sufficiently dense position.

In addition, the control unit 20 is made responsive to scene brightness by a photocell 25. When scene brightness is above a predetermined level, for example that of direct sunlight, above which it is desired to protect the image sensor 1, the photocell 25 provides a signal to the control unit 20 to initiate and maintain OVEREXPOSURE mode operation. Light from the scene is transmitted to the photocell 25 by an optical lens 26 through a neutral density filter 27. The neutral density filiter 27 is provided so that it is not necessary to provide a photocell 25 capable of withstanding direct sunlight. The system remains in the OVEREXPOSURE as long as the level of scene brightness remains above the predetermined level.

Furthermore, in a system in which the image sensor 1 comprises a tube having a filamentary cathode rather than a solid state device, it is desirable to provide additional protection for the image sensor 1 during periods of warm-up. During warm-up, the sensor 1 is incapable of providing a useful signal to the amplifier 13 in response to the intensity of light on the photosurface of the image sensor 1. Such protection is especially important when it is desired to have the system operative for only a portion of each day since the image sensor 1 must be protected during each warm-up period. For this reason, the control unit 20 is also coupled to a voltage delay circuit 30 which is connected to the power supply 31 of the image sensor 1. When the image sensor 1 is initially energized, the voltage delay circuit 30 delivers an output to the control unit 20 to cause it to produce a command signal of the second level and operate the system in the OVEREXPOSURE mode. A time-delay circuit is provided in the voltage delay circuit 30 to permit NORMAL mode operation after a time period sufficient to allow warm-up of the image sensor 1.

It should be understood that the variable neutral density filter 2 could comprise many other forms. For example, the counter-rotating discs 4 and 5 could be replaced with a tape loop in which the neutral density varies in opposite directions along the opposing faces of the tape. The neutral density filter 2 could also be replaced with other controllable light-compensating means such as variable-aperture motor-driven iris. However, the motor-driven iris is less desirable since within practical limits, it could be adjusted from $f/0.9$ to $f/32$ and would only provide control over a range of illumination of 1000 to 1. It would be impractical to close down a variable iris beyond $f/32$ since diffraction limiting, commonly called vignetting, usually occurs and quality of the optical information received by the image sensor 1 is limited. In addition, image quality may be reduced due to changes in depth of field. Electronic methods, such as varying image sensor bias to vary the output of the image sensor 1, and hence the output of the amplifier 13, could also be employed, but such arrangements are effective over a range in scene brightness of only 100 to 1.

Figure 2:
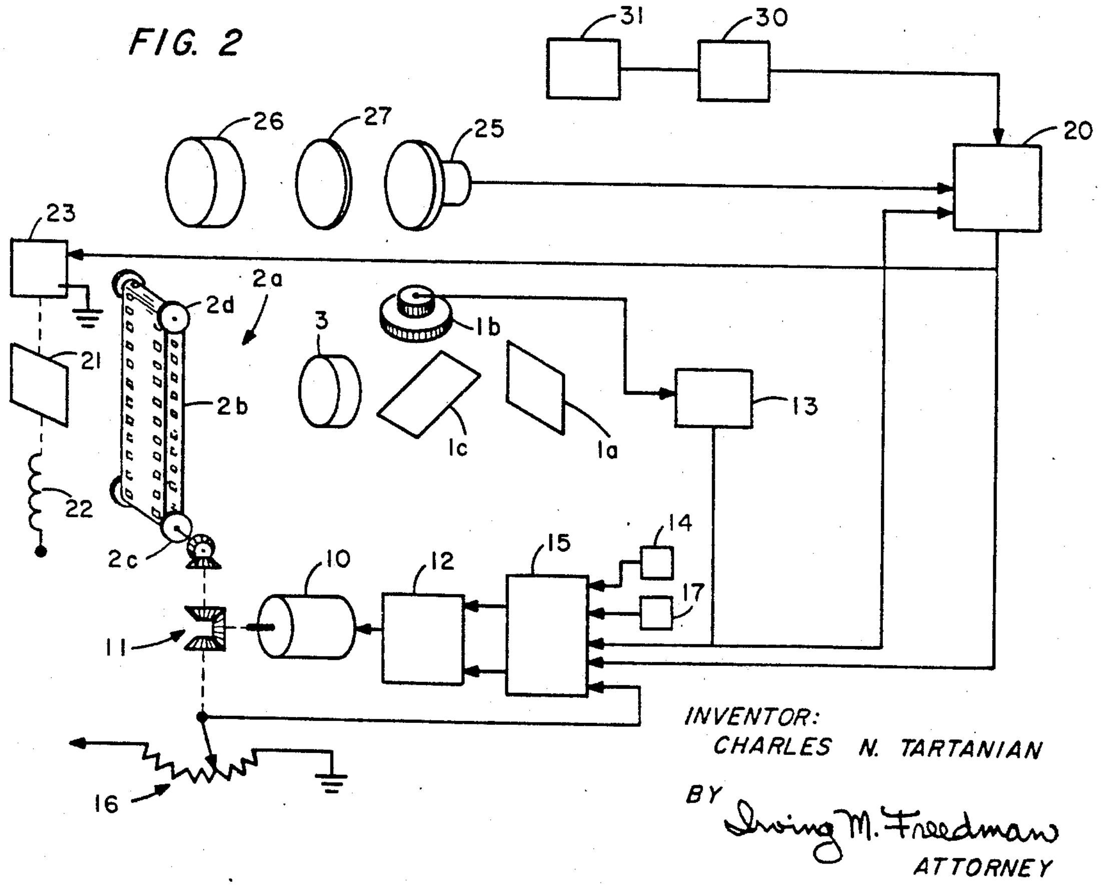
FIG. 2 is a diagrammatic representation of another form of the invention.

The use of the automatic light control system is not limited to television arrangements. It could be utilized to control light transmission to a photographic plate, motion picture camera or other light sensitive device. A separate sensor responsive to scene brightness could be provided to produce a signal indicative of the illumination on the photosensitive element included in the system, if the element itself does not produce an electrical output. For example, there is shown in FIG. 2, in which the same reference numerals are used to denote elements which correspond to those in FIG. 1, a system which controls the admission of light to a photographic plate 1*a*. This arrangement is useful in obtaining a time-exposure. Light-compensating means are provided in the form of a variable neutral density filter 2*a* which, in this embodiment, comprises a neutral density filter tape 2*b* mounted on rotatable drum members 2*c* and 2*d* mechanically coupled to the servomotor 10 by means of the mechanical coupling arrangement 11. The optical density on the opposing faces of the tape 2*b* varies linearly with length in opposite directions. When the displacement of the motor 10 is changed, drum 2*c* is rotated to move the tape and vary the opacity of the filter 2*a*. Since the photographic plate 1*a* does not produce an output as does the image sensor 1 in the arrangement shown in FIG. 1, a photocell 1*b*, having an output is connected to the input of the amplifier 13. The NORMAL control signal is made representative of the illumination on the surface of the photographic plate 1*a* by employing a beam splitting mirror 1*c* disposed between the optical lens 3 and photographic plate 1*a*. The mirror 1*c* optically couples the photocell 1*b* to sense the intensity of light admitted to the photographic plate 1*a*. The level of the NORMAL reference source 14 may be set so that it corresponds to the output of the amplifier 13 when the intensity of light on the photographic plate 1*a*, as sensed by the photocell 1*b*, is at the optimum level for proper exposure. The override level at which the system is switched into OVEREXPOSURE mode operation may be that which would cause undue exposure of the photographic plate 1*a*.

SUMMARY OF OPERATION

During operation of the arrangement shown FIG. 1, after image sensor warm-up, the system operates in the NORMAL mode. The shutter 21 is opened, and light from the scene is transmitted through the filter 2 and optical lens 3 to the photosurface of the image sensor 1. Output of the image sensor 1 is coupled to the amplifier 13 which produces a NORMAL mode control signal representative of the illumination of the photosurface of the image sensor 1. The amplifier 13 and NORMAL reference source 14 are connected to the error sensing circuit 12 by the bilevel logic switching circuit 15. The error sensing circuit 12 produces an output proportional to the error between the NORMAL mode control signal and reference potential to change the displacement of the motor 10. The motor 10 rotates the discs 4 and 5 within the filter 2 to vary the opacity of the filter 2 until the error is nulled and photosurface illumination is at the desired level.

When the scene brightness suddenly increases so that the illumination on the photosurface of the image sensor 1 reaches the override level before the filter 2 can provide sufficient light compensation, the NORMAL mode control signal increases. This signal, coupled to the control unit 20, is sufficient to operate the control unit 20 to produce a command signal of the second level. The bilevel logic switching circuit 15 connects the output of the analog circuit 16 and the reference potential 17 to the inputs of the error sensing circuit 12, and the system operates in the OVEREXPOSURE mode. When the system is operating in the OVEREXPOSURE mode, the discs 4 and 5 in the filter 2 rotate toward their most dense position. The control unit 20 also de-energizes the shutter actuator 23 so that the shutter 21 is closed during OVEREXPOSURE mode operation.

The photocell 25 is coupled to the control unit 20 so that it is responsive to scene brightness. When scene brightness increases above a predetermined level, the output of the photocell 25 operates the control unit 20 to produce an OVEREXPOSURE mode command signal. In addition, the voltage delay circuit 30, which is coupled to the power supply 31, is coupled to the control unit 20 to maintain the system in the OVEREXPOSURE mode during periods of image sensor warm-up.

It is seen that the operation of the system is highly advantageous in that the system provides optimal light compensation for the image sensor 1 over a large range of scene brightness in the NORMAL mode of operation. However, when the scene brightness is such that the danger of damage to the image sensor 1 is present, the system operates in the OVEREXPOSURE mode to provide maximum protection for the image sensor 1 in a most rapid manner.

Figure 3:
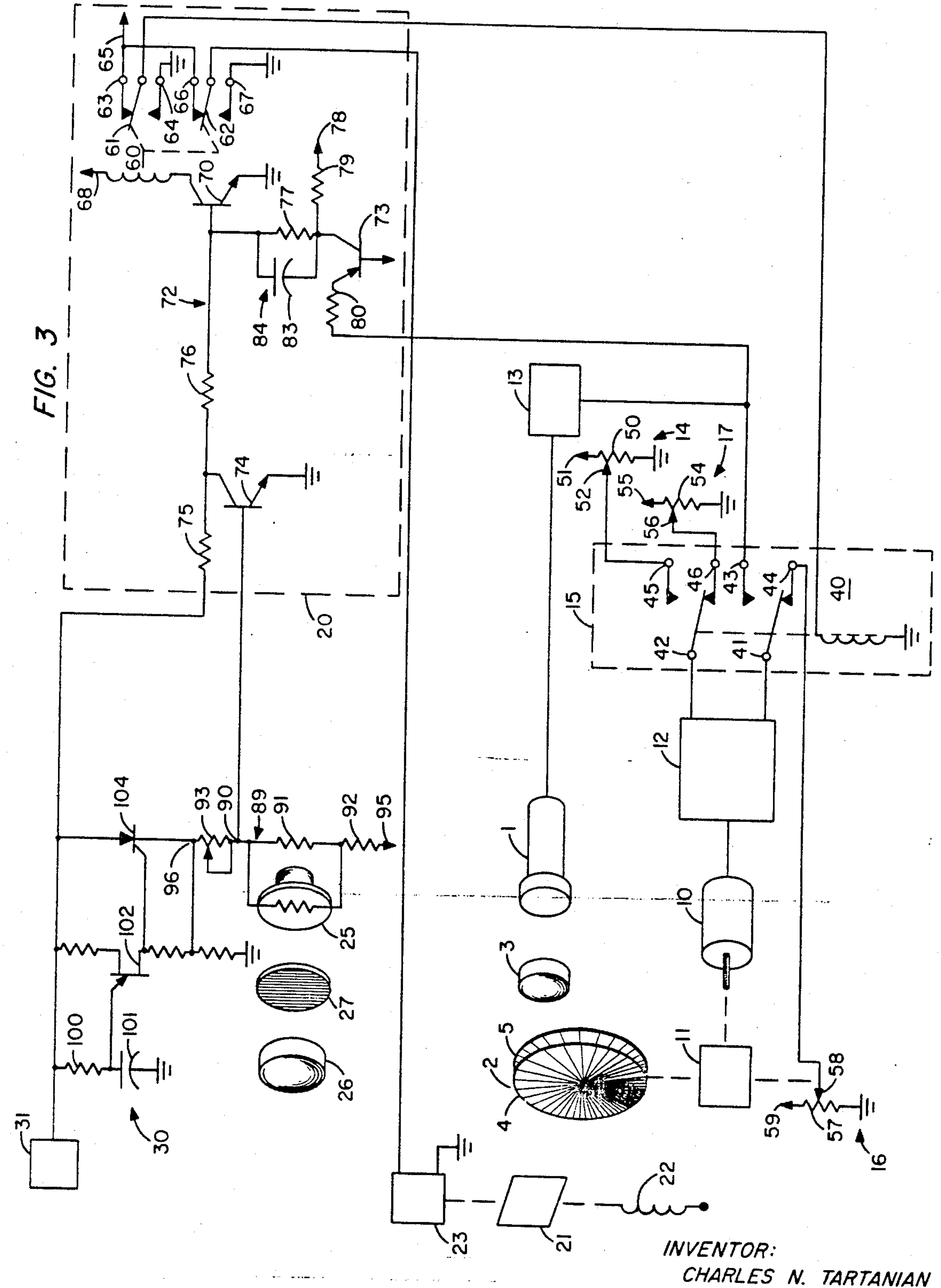
FIG. 3 is a diagrammatic representation, partially in block diagram form, and partially in schematic form, illustrating circuitry with which the arrangement shown in FIG. 1 may be achieved.

Specific circuitry used to achieve operation of the system shown in FIG. 1 is illustrated in FIG. 3. Portions of the circuitry associated with the mechanical and optical components of the automatic light control system are shown in block diagrammatic form in FIG. 3, and further details of the circuit are shown in schematic form. In FIG. 3, the same reference numerals are used to denote elements having the same function as those in the arrangement in FIG. 1. Solid lines illustrate electrical connections while dotted lines denote mechanical connections.

The bilevel logic switching circuit 15 may conveniently comprise a double-pole, double-throw relay including first and second ganged switches 41 and 42 which are connected to the inputs of the error sensing circuit 12. Terminals 43 and 44, provided on the switch 41, are respectively connected to the outputs of the amplifier 13 and the analog circuit 16. The NORMAL mode reference source 14 is connected to a terminal 45 included in the switch 42 while the overexposure reference source 17 is connected to the switch 42 by means of a terminal 46. When the relay 40 is energized, the switch 41 is connected to the terminal 43 and the switch 42 is connected to the terminal 45. In this manner, the NORMAL mode control signal and NORMAL mode reference source are coupled to the inputs of the error sensing circuit 12 so that the system operates in the NORMAL mode. When the relay 40 is de-energized, the switch 41 is connected to the terminal 44 and the switch 42 is connected to the terminal 46 so that the system operates in the OVEREXPOSURE mode.

The NORMAL mode reference source 14 comprises a potentiometer 50 which is connected to a source of potential 51 and provides an output at wiper arm 52. Similarly, the OVEREXPOSURE mode reference source comprises a potentiometer 54 coupled to a potential source 55 to provide an output at a wiper arm 56. The wiper arms 52 and 56 are respectively connected to the terminals 45 and 46 in the bilevel logic switching circuit 15. Either of the sources 14 or 17 could comprise a fixed potential source. However, the provision of the potentiometer in each source allows for adjustment of the level of photosurface illumination to be maintained or maximum light compensation to be provided.

The analog circuit 16 comprises a potentiometer 57 which includes a wiper arm 58 mechanically coupled to the mechanical coupling arrangement 11. One end of the potentiometer 57 is connected to a source of potential 59. The potential at the wiper arm 58 varies as it is moved by the mechanical coupling arrangement 11 when the discs 4 and 5 within the filter 2 are rotated. The potential at the wiper arm 58 comprises the output of the analog circuit 16 and is coupled to the terminal 44 in the bilevel logic switching circuit 15.

The bilevel command signal which energizes the bilevel logic switching circuit 15 in the NORMAL or OVEREXPOSURE mode is provided by a relay 60 incorporated in the control unit 20 and having its upper end connected to a source 68. The relay 60 includes a first single-pole, double-throw switch 61 which is connected to the relay 40. Terminals 63 and 64 of the switch 61 are respectively coupled to a source of positive potential 65 and to ground potential. A second single-pole double-throw switch 62 is provided in the relay 60 and connected to the shutter actuator 23. Terminals 66 and 67 of the switch 62 are respectively connected to the source 65 and to ground potential. De-energization of the relay 60 connects the switch 61 to the terminal 63 and the switch 62 to the terminal 66. The potential provided by the source 65 is coupled across the relay 40 and across the shutter actuator 23. The relay 40 is energized so that the bilevel logic switching circuit 15 is energized for NORMAL mode operation, and the shutter actuator 23 is energized to remove the shutter 21 from in front of the image sensor 1. When the relay 60 is energized, the switches 61 and 62 respectively couple ground potential to the relay 40 and the shutter actuator 23 to de-energize them and initiate OVEREXPOSURE mode operation. The potential provided by the source 65 comprises the first level of the command signal, while ground potential comprises the second level.

It should be noted that the relays 40 is energized and 60 is de-energized to provide NORMAL mode of operation. Relay 40 is de-energized and relay 60 is energized to provide OVEREXPOSURE mode operation. These are only one means by which desired operation may be achieved. If desired, the switches 41 and 42 in the relay 40 could be replaced with SCR's, each having its gate connected to the switch 61 in the control unit 20. Many other electronics schemes are also possible.

The control unit 20 further includes a relay driver comprising an NPN transistor 70 having its emitter connected to ground potential and its collector connected to the lower end of the relay 60. When the transistor 70 saturates, the potential difference between the source 68 and ground is coupled across the relay 60 to energize it. The output of the amplifier 13 is coupled to a PNP threshold switching transistor 73 which in turn is coupled to the base of the transistor 70 to make the control unit 20 responsive to photosurface illumination. By coupling the photocell 25 and voltage delay circuit 30 to an inverting amplifier transistor 74, which is in turn coupled to the base of the transistor 70, the control unit 20 is operable in response to scene brightness and image sensor warm-up. The transistor 74 is a grounded-emitter NPN transistor having its base connected to the photocell 25 and its collector coupled to the power supply 31 by a resistor 75. The emitter of the transistor 74 is connected to ground potential.

Voltages are coupled to the base of the transistor 70 by means of a voltage divider 72 connected between the power supply 31 and the collector of the transistor 73. The voltage divider 72 comprises a resistor 75 connected between the power supply 31 and the collector of the transistor 74, a resistor 76 connected in series between the resistor 75 and the base of the transistor 70 and a resistor 77 connected between the base of the transistor 70 and the collector of the threshold switching transistor 73. A negative source 78 is coupled to the collector of the transistor 73 by a resistor 79. When the transistor 73 is off, the voltage divider 72 couples a negative potential from the source 78 to bias the transistor 70 off. When the transistor is on, its collector potential becomes positive, and the resistor 79 and source 78 are effectively disconnected from the voltage divider 72.

The transistor 73 is connected in grounded-base configuration with its base connected for suitable biasing, its emitter connected to the resistor 80, and its collector connected to the resistor 77. During NORMAL mode operation, the transistor 73 is biased off. Consequently, the potential appearing at the base of the transistor 70 is below ground potential so that the transistor 70 remains off. However, if scene brightness suddenly increases such that the photosurface illumination of the image sensor 1 reaches the override level before the filter 2 provides sufficient light compensation, a positive potential responsive to the output of the amplifier 13 is coupled to the emitter of the transistor 73 from the resistor 80 to saturate the transistor 73. When the transistor 73 saturates, its collector potential rises to approximately its emitter potential. The potential coupled to the base of the transistor 70 is raised to a positive level and the transistor 70 saturates. The relay 60 is energized to initiate OVEREXPOSURE mode operation.

It should be noted that the output of the amplifier 13 goes to its lowest level after OVEREXPOSURE mode operation is initiated, due to the closing of the shutter 21. Consequently, the transistor 73 turns off. Cycling from the NORMAL mode to the OVEREXPOSURE mode continues as long as the photosurface illumination remains at the override level. To minimize cycling, a capacitor 83 is connected across the resistor 77. The resistor 77 and the capacitor 83 form a holding circuit 84 connected to the base of the transistor 70. The transistor 70 is held on and OVEREXPOSURE mode operation continues for a period of time after the transistor 73 turns off determined by the RC time constant of the holding circuit 84.

OVEREXPOSURE mode operation is also initiated when a predetermined level of scene brightness is sensed by the photocell 25. The photocell 25 comprises a negative coefficient resistance photoconductive device. One terminal of the photocell 25 is connected to a terminal 90 which is coupled to the base of the transistor 74. The photocell is coupled across resistor 91 included in a voltage divider 89 comprising a resistor 92, connected in series with the resistor 91, a terminal 90, a calibrating potentiometer 93 and a resistor 94. A negative source 95 is connected to the resistor 92, and in NORMAL mode a positive potential exists at terminal 96. The values of the resistors are chosen so that when the level of scene brightness sensed by the photocell 25 is below the predetermined level, the potential at the terminal 90 is sufficient to saturate the transistor 74. The calibrating potentiometer 93 may be adjusted to pre-set the predetermined level.

When the transistor 74 is saturated, its collector is at approximately ground potential. The transistor 70 is cutoff, the relay 60 is de-energized and the system operates in the NORMAL mode. When scene brightness exceeds the predetermined level, the resistance of the photocell 25 decreases so that the potential at the terminal 90 decreases below ground potential. Consequently, the transistor 74 is cut off so that the potential coupled from the power supply 31 to the collector of the transistor 74 is supplied to the resistor 76 and the base of the transistor 70. The transistor 70 saturates, the relay 60 is energized, and the OVEREXPOSURE mode operation is initiated.

Finally, protection of the image sensor by maintaining the system in the OVEREXPOSURE mode during warm-up is achieved in the following manner. During warm-up, the voltage delay circuit 30 maintains the potential at terminal 90 negative with respect to the potential at the emitter of transistor 74. The transistor 74 is cut off and the system is operated in the OVEREXPOSURE mode. The voltage delay circuit 30 includes a time-constant circuit including series-connected resistor 100 and capacitor 101 connected between the power supply 31 and ground. The values of the resistor 100 and capacitor 101 are chosen so that the time constant is equal to a time period sufficient to allow warm-up of the image sensor 1. The junction between the resistor 100 and capacitor 101 is connected to the emitter of a unijunction transistor or UJT 102, the upper base of which is coupled to the power supply 31 and the lower base of which is coupled to ground. When the capacitor 101 is charged sufficiently, it triggers the UJT 102. The lower base of the UJT 102 is connected to the gate of an SCR 104. The anode of the SCR is connected to the power supply 31, and the cathode of the SCR 104 is coupled to the terminal 90 through the calibrating potentiometer 93. When the UJT 102 is triggered, the pulse appearing at its lower base gates the SCR 104. The SCR 104 conducts to raise the potential at the terminal 90 to saturate the transistor 74. Consequently, the transistor 70 is cut off, and NORMAL mode operation commences.

The invention thus described provides for an advantageous system which regulates photosurface illumination in a NORMAL mode of operation and provides for maximum protection of the image sensor in an OVEREXPOSURE mode. The image sensor is protected during high levels of scene brightness when optical information received is not useful and when the level of photosurface illumination presents the danger of damage to the image sensor.

While there have been shown and described specific embodiments of this invention, it is not desired that the invention be limited to the particular constructions shown and described and it is intended by the appended claims to cover all modifications within the spirit an scope of this invention.

What is claimed as new and desired to be secured by Letters Patent of the United States is:

1. In an automatic light control system for regulating the intensity of light admitted to a photosurface as scene brightness varies and for protecting the photosurface from excessive light, the combination comprising:

(a) an image sensor for producing an output in proportion to the photosurface illumination;

(b) first means disposed in front of said image sensor for controlling the amount of light admitted to the photosurface;

(c) an error circuit connected to said first means for varying the position of said first means in response to the output of said error circuit;

(d) second means coupled to said first means for producing an output proportional to the position of said first means;

(e) a switching circuit energizable to first and second states;

(f) a control unit having an input responsive to photosurface illumination and an output comprising command signals coupled to said switching circuit, said control unit producing a first command signal when the photosurface illumination is below an override level to energize said switching circuit in its first state and producing a second command signal when the photosurface illumination is above the override level to energize said switching circuit in its second state;

(g) said switching circuit in its first state connecting the output of said image sensor to said error circuit for maintaining the intensity of light received by said image sensor at a desired level for optimal reception of optical information and in its second state connecting the output of said second means to said error circuit for protecting said image sensor from excessive light.

2. A system as defined in claim 1 in which the output of said image sensor is connected to said control unit to indicate photosurface illumination.

3. A system as defined in claim 1 and further including a light-responsive element responsive to scene brightness and connected to said control unit, said control unit producing the first command signal when scene brightness is below a predetermined level and producing the second command signal when scene brightness is above the predetermined level.

4. A system as defined in claim 1 and further including:

(h) a power supply associated with said image sensor;

(i) means coupled from the output of said power supply to said control unit for producing the second command signal when said power supply is initially energized, and (j) time delay means coupled to said power supply and said control unit for producing the first command signal after a time period sufficient to allow warm-up of said image sensor.

5. A system as defined in claim 1 and further including:

(h) a shutter movable between a first position permitting transmission of light to said image sensor and a second position blocking transmission of light to said image sensor; and (i) a shutter actuator energizable by said control unit for moving said shutter to its second position when the second command signal is produced by said control unit.

6. In an automatic light control system for regulating the intensity of light admitted to a photosurface as scene brightness varies and for protecting the photosurface from excessive light, the combination comprising:

(a) an image sensor for producing an output in proportion to the photosurface illumination;

(b) controllable means disposed in front of said image sensor for controlling the amount of light received by the photosurface;

(c) a motor for driving said controllable means to vary the light transmitted to the said image sensor;

(d) an analog circuit connected to said motor for producing an output proportional to the displacement of said motor;

(e) a light-responsive element for producing an output in proportion to scene brightness;

(f) an error circuit having first and second input terminals and having an output connected to said motor for varying the displacement of said motor in accordance with the output of said error circuit;

(g) a first source of reference potential for comparison with the output of said image sensor;

(h) a second source of reference potential for comparison with the output of said analog circuit;

(i) a switching circuit energizable to first and second states for selectively connecting the output of said image sensor to the first input terminal of said error circuit and said first source of reference potential to the second input terminal of said error circuit when said switching circuit is energized in its first state and connecting the output of said analog circuit to said first input terminal of said error circuit and said second source of reference potential to the second input terminal of said error circuit when said switching means is energized in its second state;

(j) a control unit having a first input responsive to photosurface illumination and a second input responsive to scene brightness and an output comprising command signals coupled to said switching circuit, said control unit producing a first command signal when photosurface illumination is below an override level and when the scene brightness is below a predetermined level for energizing said switching circuit to its first state and producing a second command signal for energizing said switching circuit in its second state when the photosurface illumination exceeds the override level or when the scene brightness exceeds the predetermined level;

(k) a shutter controlled by said control unit for blocking transmission of light to said image sensor when the second command signal is produced by said control unit;

(l) a power supply associated with said image sensor; and (m) time delay means coupled to said power supply and said control unit for preventing transmission of the first command signal until after a time period sufficient to allow warm-up of said image sensor.

References Cited

UNITED STATES PATENTS

| | | | |
|---|---|---|---|
| 2,302,554 | 11/1942 | Kingsbury | 250—229 X |
| 3,209,667 | 10/1965 | Coutant | 352—141 X |
| 3,348,059 | 10/1967 | Schellhase | 250—217 X |
| 3,427,941 | 2/1969 | Metzger | 352—141 X |
| 3,010,362 | 11/1961 | Smith | 352—222 X |

RAYMOND F. HOSSFELD, Primary Examiner

C. R. CAMPBELL, Assistant Examiner

U.S. Cl. X.R.

250—208, 217, 229, 234, 237; 352—141; 356—235